United States Patent

[11] 3,622,298

| [72] | Inventors | George R. Machlan;<br>Craig L. Thom, both of Granville, Ohio |
|---|---|---|
| [21] | Appl. No. | 849,765 |
| [22] | Filed | Aug. 13, 1969 |
| [45] | Patented | Nov. 23, 1971 |
| [73] | Assignee | Owens-Corning Fiberglas Corporation |

[54] METHOD AND APPARATUS FOR MANUFACTURING GLASS FILMS
10 Claims, 5 Drawing Figs.

[52] U.S. Cl. .................................................. 65/91, 65/129, 65/199, 65/325
[51] Int. Cl. ....................................................... C03b 17/00
[50] Field of Search .......................................... 65/90, 91, 126, 129, 193, 199, 201, 325, 333

[56] References Cited
UNITED STATES PATENTS

| 2,422,466 | 6/1947 | Brown | 65/193 |
| 3,271,125 | 9/1966 | Lipp | 65/129 X |
| 3,473,911 | 10/1969 | Stein | 65/325 |
| 2,509,845 | 5/1950 | Slayter | 65/193 |

*Primary Examiner*—Arthur D. Kellogg
*Attorneys*—Staelin & Overman and Ronald G. Hudgens ABSTRACT: Method and apparatus for producing a thin sheet of thermoplastic material employing a container for holding a supply of the material where one of the container walls possesses openings through which the thermoplastic material leaves the container and using a reservoir region with an elongated outlet in communication with the openings. The material flows from the elongated outlet as a thin relatively wide stream and is attenuated into a thin sheet.

GEORGE R. MACHLAN &
CRAIG L. THOM
INVENTORS

BY
Staelin + Overman
ATTORNEYS

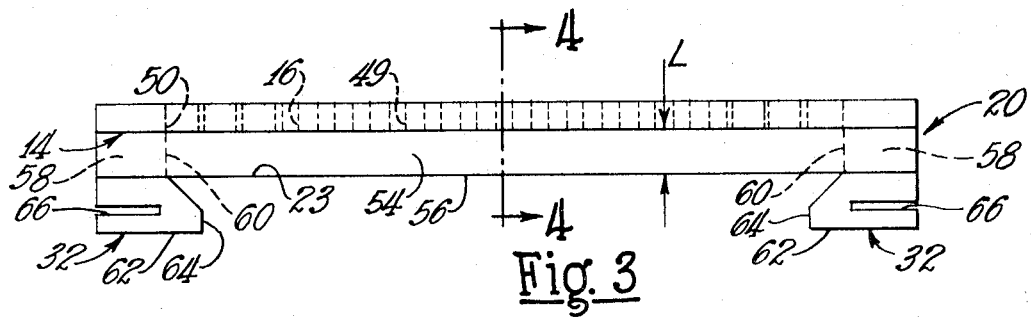
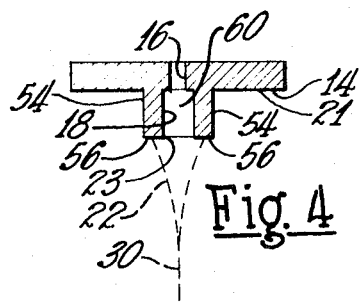
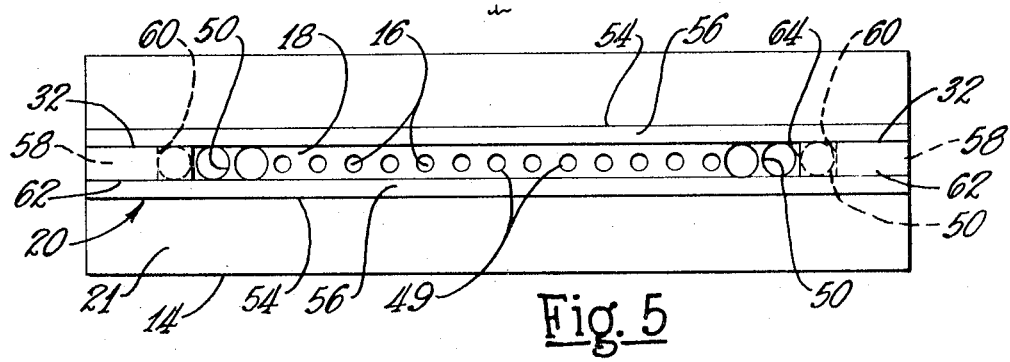
GEORGE R. MACHLAN &
CRAIG L. THOM
INVENTORS
BY
*Staelin + Overman*
ATTORNEYS

METHOD AND APPARATUS FOR MANUFACTURING GLASS FILMS

BACKGROUND OF THE INVENTION

While there exists manufacturing techniques that produce thin sheets of thermoplastic materials such as glass, the aspect of product dimensional nonuniformity troubles products produced using these techniques. Uniform thinness in all directions across these thin sheets is still only a goal, especially in the manufacture of thin glass sheets or films.

There is a strong need for uniformly thin sheets of thermoplastic material. For example, uniformly thin sheets of glass could find wider use as a substitute for mica in the manufacture of condensers for electrical equipment, such application of glass requires a product of precise dimensions. Also, foliated glass in the form of thin glass flakes processed from glass sheets or films requires uniform dimensions in its myriad applications including its use as a reinforcing agent for a host of materials, e.g. synthetic resins, paints, elastomers, etc.

SUMMARY OF THE INVENTION

An object of the invention is improved method of and apparatus for manufacturing continuously thin sheets of thermoplastic materials such as glass.

Another object of the invention is a method of and apparatus for producing a thin sheet of thermoplastic material such as glass that is substantially free from variations in thinness.

Yet another object of the invention is a method of and apparatus for producing a uniformly thin sheet of thermoplastic material such as glass that employs a container for holding a supply of thermoplastic material where one of the walls has discharge openings surrounded by structure defining a discharge passageway or reservoir communicating with the openings and into which thermoplastic material leaving the container flows.

Other objects and advantages of the invention will become apparent as the invention is described more clearly hereinafter in detail with reference made to the accompanying drawings.

DESCRIPTION OF THE DRAWINGS

FIG. 3 is a side elevation view of the outlet arrangement at the bottom wall of the container or bushing shown in FIGS. 1 and 2.

FIG. 4 is a transverse section taken along the lines 4—4 indicated in FIG. 3.

FIG. 5 is a plan view of the outlet arrangement at the exterior surface of the bottom wall of the container or bushing shown in FIGS. 1-4.

DESCRIPTION OF THE PREFERRED EMBODIMENTS

While one may advantageously use the present invention for fabricating sheets or films of thermoplastic materials that are molten at high temperatures and gradually increase in viscosity to solidify as they cool, the invention finds particular use in fabricating sheets or films of glass.

Figure 1:
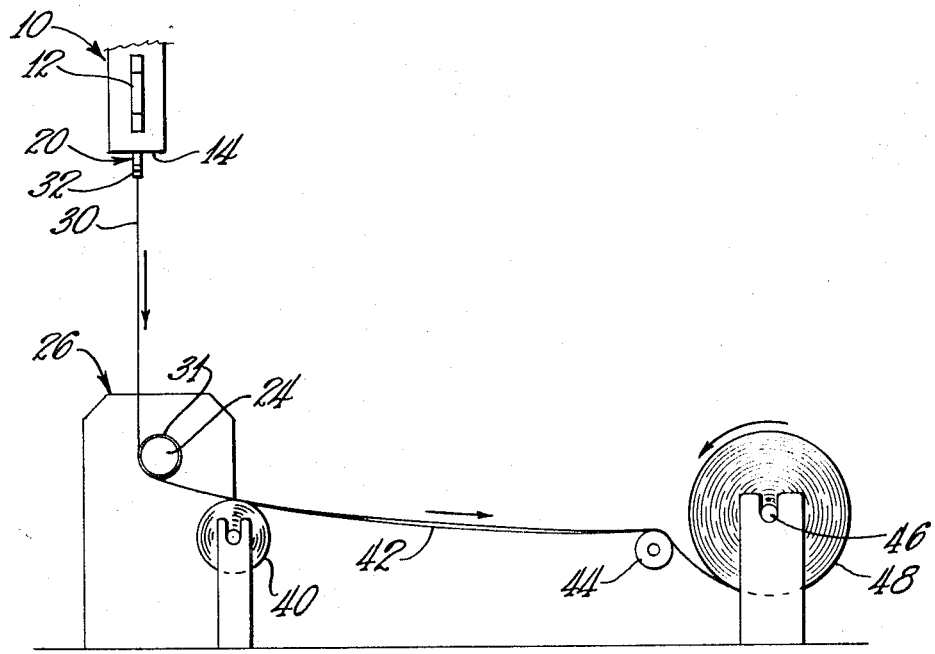
FIG. 1 is a somewhat simplified side elevation view of apparatus for forming a thin sheet of glass according to the principles of the invention.
Figure 2:
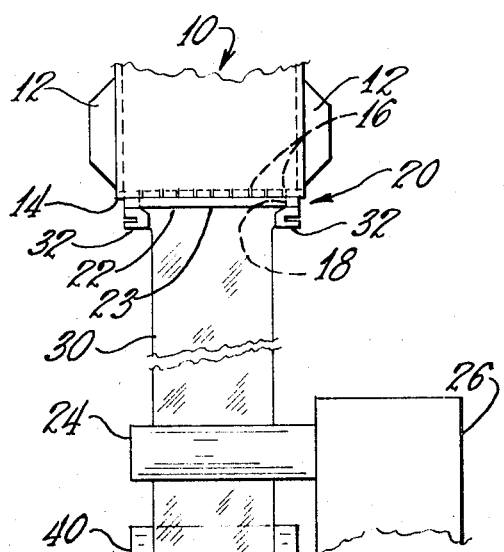
FIG. 2 is a front elevation view of the apparatus shown in FIG. 1.

FIGS. 1 and 2 show apparatus for processing molten glass into a continuous thin glass film that collects as a wound package on a collector. Illustrated is a container or bushing 10 that holds a supply of molten glass. The container 10 may connect to a forehearth that supplies molten glass from a furnace or may connect to means for supplying glass such as glass marbles that reduce to a heat softened condition in a melter or other means associated with the container 10. A forehearth supply is preferred. Located on the container 10 are terminals 12 that connect to a source of electrical energy to supply heat to the container 10 by conventional resistance heating to maintain the molten glass at a proper film forming temperature and viscosity. Moreover, the container 10 provides a film forming zone or outlet arrangement at the container's bottom wall 14 that includes a plurality of openings 16 through which molten glass flows from the container 10 into a discharge reservoir region or passageway 18 in a discharge portion 20 on the container 10, the discharge passageway 18 extending from the external surface 21 of the bottom wall 14. The channel or passageway 18 discharges the molten glass at an elongated outlet 23 as a thin relatively wide molten stream 22.

Pulling means such as a rotating cylindrical pull roll 24 on a pulling device 26 attenuates the molten glass stream 22 into a continuous thin glass film 30. In practice the pull roll 24 employs a rubber or elastomeric material on its cylindrical surface. One may stretch a thin tube of rubber 31 over the cylindrical roll 24. The cylindrical rubber surface enhances frictional engagement of the pull roll 24 with the film 30 to impart pulling forces that attenuate the molten stream 22 without harming the film 30.

Because the molten glass stream 22 tends to "neck down" as it issues from the elongated exit of the passageway 18, the apparatus provides spaced apart edge stabilizers 32 that are present at opposite edges of the stream 22 in heat conducting relationship to the container 10. The edge stabilizers 32 are made of a metal capable of being wetted by the molten glass of the stream 22 at elevated temperatures, preferably platinum or an alloy of platinum.

After the glass film 30 advances from the pull roll 24, the glass film 30 comes together with a support sheet that travels with it to a collector. As illustrated, a package 40 supplies a sheet of Kraft paper 42 onto which the film 30 moves. The Kraft paper 42 and the glass film 30 in supported relation on the Kraft paper 42 advance together to a guide roll 44 and thence onto a mandrel 46 as a wound package 48. A suitable motor such as an electric motor, which is not shown, suitably rotates the mandrel 46. The layers of Kraft paper 42 in the package 48 separate the layers of glass film 30.

FIGS. 3 through 5 more clearly show the construction of the outlet arrangement at the bottom wall 14 through which molten glass flows to leave the interior of the container 10 to form the relatively wide molten stream 22 at the outlet 23 of the discharge passageway 18. As shown, the rectangular bottom wall 14 contains a straight line row of the openings 16 that are shown as circular and through which molten glass moves to leave the container 10. While the row of openings 16 is normally oriented generally as a straight line, it may be useful at times to arrange the openings into other groupings. The openings 16 normally include openings of two sizes, i.e. openings 49 that comprise the majority of openings in the row and larger end openings 50. Figs. 3 and 5 show three of the larger openings 50 at each end of the row. While the number of the smaller openings 49 can vary, it has been useful to employ from 20 to 25 of these openings per inch having a diameter of 0.040 inch and with their centers located 0.050 inch apart. Moreover, using this number of openings 49 per inch it has been successful to employ larger end openings 50 with a diameter of 0.062 inch with their centers spaced apart 0.070 inch. Generally it is advantageous to employ smaller openings 49 having a diameter greater than one-half the diameter of the larger openings 50. The material of the bottom wall 14 between the openings 16 holds the size of the openings essentially constant. Such constant opening size insures substantially uniform metered flow of molten glass into the discharge passageway 18.

As the molten glass moves through the openings 49 and 50, the openings meter the flow of molten glass from the interior of the container 10 into the discharge passageway 18 having the elongated outlet 23. The discharge passageway 18 communicates at its inner end with the openings 49 and 50 and extends away therefrom through the discharge portion 20. The discharge passageway 18 and the openings 16 are proportioned in size to ensure a discharge passageway filled with molten glass. The length of the passageway 18, "L" as seen in Fig. 3, is normally less than one-eighth of an inch. As more clearly shown in FIGS. 3 through 5 the discharge portion 20 includes spaced apart longitudinal raised portions 54 and rectilinear portions 58 of the edge stabilizers 32. The longitudinal raised portions 54 are spaced apart a distance equal to the diameter of the end openings 50 and the opposing interior surfaces 60 of the rectilinear portions 58 are spaced apart a distance slightly greater than the length of the row of openings 16 (openings 49 and 50). The exposed edge surfaces of the 56 longitudinal raised portions form surfaces at the outlet 23 that are spaced from the external surface 21 of the bottom wall 14.

As shown, each of the edge stabilizers 32 includes both the rectilinear portion 58 and a stabilizer portion 62 that includes a glass contacting portion 64 extending towards the glass contacting portion 64 of the other edge stabilizer 32. The glass contacting portions terminate with their closest opposing surfaces spaced apart less than the length of the outlet 23. Moreover, each of the edge stabilizers 32 contain a slot 66 in the stabilizer portion 64 to assist in heat dissipation.

In operation the openings 49 and 50 meter the flow of molten glass from the container 10 into the discharge passageway 18, from which the molten glass emerges as the relatively wide molten stream 22. The uniform regulating or metering effect of the openings 16 provides a constant rate of molten glass flow into the discharge passageway 18. The passageway 18 is a reservoir region having a uniform flow from its outlet 23. The glass contacting portions 64 of the edge stabilizers engage the edges of the stream 22 and become wetted, usually on both sides, as the molten glass flows over it. Because the edged stabilizers 32 heat the edges of the molten stream 22, the molten stream tends to be drawn laterally outwardly on the edge stabilizers 32 to counteract any tendency for the stream to "neck down" in response to surface tension. The larger openings 50 meter a larger volume of molten glass demanded by flow across the edge stabilizers 32. As the pull roll 24 attenuates the film 30 the edges of the molten stream 22 engaging the edge stabilizers 32 "strip off" to provide smooth film attenuation.

As indicated by the dashed lines in FIG. 4, the stream 22 finds support on the end surfaces 56 of the longitudinal raised portions 54, the end surfaces 56 being spaced from the external surface 21 of the bottom wall 14. As in the case of molten glass streams issuing from the outlets of tubular projections on a bushing manufacturing glass fibers, the separation of the end surfaces 56 from the exterior surface 21 of the bottom wall 14 substantially precludes the tendency of the molten glass to flood across the surface 21, which interrupts the process.

The dimensions of the film 30 depends upon a number of variables, e.g. the size of the openings 49 and 50 and the dimensions of the elongated outlet 52 of the discharge passageway 18. While the dimensions of the apparatus may vary depending upon the particular width and thickness of the ribbon desired, particularly satisfactory results have been obtained employing orifice 49 having a diameter 0.040 inch and openings 50 having a diameter 0.062 inch. When employing such dimensions for the openings 16 of the outlet arrangement, it has been satisfactory to employ glass contacting portions 64 having a thickness equal to the width of the discharge passageway 18, which is also the diameter of the end openings 50. When one uses such a container construction it has been found useful to employ film attenuating speeds in the range of from 20 to 500 feet per minute, the glass film 30 produced having a film thickness of from 10 to 100 hundred thousandths of an inch.

We claim:

1. Apparatus for producing a thin sheet of thermoplastic material comprising:
   a container for holding flowable thermoplastic material, the bottom wall of the container having a generally aligned row of openings;
   opposing surfaces protruding from the bottom wall and surrounding the openings to define a single discharge passageway in communication with the openings, the discharge passageway having an elongated outlet spaced from the wall;
   means for supplying thermoplastic material to the single discharge passageway from the container through the openings to fill the elongated outlet, the thermoplastic material flowing from the elongated outlet in the form of a thin relatively wide stream; and
   means for attenuating the stream into a thin sheet.

2. Apparatus for producing a thin sheet of thermoplastic material comprising:
   a container for holding a supply of thermoplastic material, the bottom wall of the container having a group of generally aligned openings through which the thermoplastic material leaves the container;
   a surface protruding from the wall surrounding the group of openings, the surface defining a discharge passageway in communication with the openings and having an elongated outlet, thermoplastic material in the container being supplied to the discharge passageway through the openings, the discharge passageway being of sufficient size with respect to the openings to continuously permit the elongated outlet to be filled with the thermoplastic material, the thermoplastic material flowing from the elongated outlet in the form of a thin relatively wide stream;
   a stabilizer member at each end of the elongated outlet in a position to be wetted by the thermoplastic material as the stream flows from the outlet; and
   means for attenuating the stream into a thin sheet.

3. Apparatus for producing a thin sheet of glass comprising:
   a container for holding a supply of molten glass, the bottom wall of the container having a generally straight row of openings through which the molten glass leaves the container;
   walls protruding from the exterior surface of the one container wall, the walls intersecting to form opposing surfaces extending about the boundary of the openings to define a discharge passageway in communication with the openings, the discharge passageway having an elongated outlet located in spaced relation from the bottom wall, the discharged passageway being supplied with molten glass from the container through the openings, the molten glass flowing from the elongated outlet in the form of a relatively wide stream;
   a stabilizer member at each end of the elongated outlet in a position to be wetted by the molten glass as the stream flows from the outlet; and
   means for attenuating the stream into a thin glass sheet, the discharge passageway and openings being proportioned in size to continuously permit the elongated outlet to be filled with the molten glass as the stream is being attenuated.

4. Apparatus for producing a uniformly thin sheet of glass comprising:
   a container for holding a supply of molten glass, the bottom wall of the container having a generally straight line row of openings through which the molten glass leaves the container, the openings at the end of the row being larger than the other openings in the row;
   two opposing longitudinal members jutting from the exterior surface of the bottom wall adjacent to the row, one longitudinal member extending along each lengthwise side of the row of openings, two opposing end members jutting from the exterior surface of the bottom wall and intersecting the longitudinal members, one end member being adjacent to each end of the row openings, the members defining a discharge passageway in communication with the openings at one end and having an elongated outlet at the other end, the members being sufficiently spaced with respect to the size of the openings to provide a passageway continuously filled with the molten glass supplied to it through the openings, the molten glass flowing from the elongated outlet in the form of a thin relatively wide stream;

a stabilizer member at each end of the elongated outlet, each of the stabilizer members extending inwardly of the elongated outlet in a position to be wetted by the molten glass as the stream flows from the outlet; and means for attenuating the stream into a thin glass sheet.

5. The apparatus recited in claim 4 where the openings are circular.

6. The apparatus recited in claim 5 where the opposing members are in parallel relationship.

7. The method of producing a thin sheet of thermoplastic material comprising:

moving flowable thermoplastic material downwardly through generally aligned openings in a wall directly into a passageway having an elongated outlet;

flowing the thermoplastic material from the elongated outlet in the form of a thin relatively wide stream;

attenuating the stream into a thin sheet, the rate of attenuation being matched with the supply of thermoplastic material through the openings to keep the elongated outlet continuously filled with thermoplastic material; and applying stabilizing forces to the edges of the stream at the outlet as the stream is being attenuated.

8. The method of producing a thin sheet of glass comprising:

supplying molten glass downwardly through a generally straight line row of openings in a wall directly into a passageway having an elongated outlet;

flowing the molten glass from the elongated outlet in the form of a thin relatively wide stream;

attenuating the stream into a thin sheet, the rate of attenuation being matched with the supply of molten glass through the openings to keep the elongated outlet continuously filled with molten glass; and applying stabilizing forces to the edges of the stream at the outlet as the stream is being attenuated.

9. Apparatus for producing a uniformly thin sheet of glass comprising:

a container for holding a supply of molten glass, the bottom wall of the container having a generally straight line row of openings through which the molten glass leaves the container;

two opposing longitudinal members jutting from the exterior surfaces of the bottom wall adjacent to the row, one longitudinal member extending along each lengthwise side of the row of openings, two opposing end members jutting from the exterior surface of the bottom wall and intersecting the longitudinal members, one end member being adjacent to each end of the row of openings, the members defining a discharge passageway in communication with the openings at one end and having an elongated outlet at the other end, the members being sufficiently spaced with respect to the size of the openings to provide a passageway continuously filled with the molten glass supplied to it through the openings, the molten glass flowing from the elongated outlet in the form of a thin relatively wide stream;

a stabilizer member at each end of the elongated outlet, each of the stabilizer members extending inwardly of the elongated outlet in a position to be wetted by the molten glass as the stream flows from the outlet; and means for attenuating the stream into a thin glass sheet including a single pulling roll for engaging the glass sheet and means for rotating the pulling roll.

10. Apparatus recited in claim 9 further including means for collecting the glass sheet into a wound package and means for supplying a support sheet to the advancing glass sheet between the pulling roll and collecting means, the support sheet being wound into the package with the glass sheet.

* * * * *